W. WRIGHT & G. O. DEGENER.
COMPUTING ATTACHMENT FOR TYPE WRITERS.
APPLICATION FILED MAR. 22, 1909.

1,247,198.

Patented Nov. 20, 1917.
7 SHEETS—SHEET 1.

W. WRIGHT & G. O. DEGENER.
COMPUTING ATTACHMENT FOR TYPE WRITERS.
APPLICATION FILED MAR. 22, 1909.

1,247,198.

Patented Nov. 20, 1917.
7 SHEETS—SHEET 2.

ns per# UNITED STATES PATENT OFFICE.

WALTER WRIGHT AND GUSTAVE O. DEGENER, OF SAN FRANCISCO, CALIFORNIA, ASSIGNORS, BY MESNE ASSIGNMENTS, TO UNDERWOOD COMPUTING MACHINE COMPANY, A CORPORATION OF NEW YORK.

COMPUTING ATTACHMENT FOR TYPE-WRITERS.

1,247,198. Specification of Letters Patent. Patented Nov. 20, 1917.

Application filed March 22, 1909. Serial No. 485,030.

*To all whom it may concern:*

Be it known that we, WALTER WRIGHT and GUSTAVE O. DEGENER, citizens of the United States, residing at San Francisco, in the county of San Francisco and State of California, have invented new and useful Improvements in Computing Attachments for Type-Writers, of which the following is a specification.

The present invention relates to computing attachments for typewriters, although it is to be understood that the invention may be embodied in an independent computing machine.

One object of the invention is to provide an apparatus of this character, which, when used with a typewriting machine, will permit of simultaneously connecting the computing mechanism with all of the numeral keys or disconnecting therefrom, so that when so connected the operation of a numeral key will actuate the computing mechanism, and also there is preferably a temporary key or other device, the actuation of which will cause the above operation to be reversed, so that, when so actuating said device, the depression of a numeral key will not cause the computing mechanism to be actuated, although, upon the release of such device, the connection will again be made; said means also preferably insuring that, when the numeral keys are permanently disconnected, and the temporary device is actuated, the numeral keys will then be temporarily connected with the computing mechanism; also means are preferably provided whereby, upon the operation of the typewriter shift key, in double case or shift key typewriters, the computing mechanism will be disconnected from the numeral keys, so that other characters than numerals may be printed by the numeral keys, without affecting the computing mechanism, while at the same time, by means of the temporary device above mentioned, the above connection may be reversed. A further object of the invention is to preferably provide means whereby the depression of the numeral keys causes the typewriter carriage to move and also actuates the computing mechanism, while at the same time preventing the operation of the computing mechanism during the movement of said carriage. A further object is to preferably prevent the operation of the computing mechanism through the depression of one numeral key until its operation, due to the previous depression of a numeral key, has been completed. A further object is, when using a plurality of computing mechanisms, and it is desired to render either temporarily inoperative, to preferably provide means for positively locking the actuating means while so rendering it inoperative.

A further object is to provide an improved connection between the typewriter carriage and the computing carriage to cause them to travel in unison; also to provide means for preventing the simultaneous depression of two numeral keys.

Other objects and advantages will hereinafter appear.

In the accompanying drawings.

*General use.*—The drawings shows the invention as applied to an "Underwood" typewriter, but it is to be understood that, with suitable changes, it may be applied to a typewriter of any standard construction, and also that the invention may be embodied in the form of a computing machine, or a computing and printing machine, complete in itself, and not attached to a typewriting machine.

*Key connection control.*—Secured to the frame 1 of the typewriting machine is a vertical plate 2 extending transversely of the machine over the key levers 3, (Figs. 1 and 3 to 6); and, secured upon the front side of said plate 2, are guides 4 for a slide bar 5. Through holes in said slide bar pass the stems 6 of hooks 7, said hooks being adapted to enter eyes 8 in loops 9 secured around the numeral key levers 10. Said hook stems, in the manner to be presently described, constitute the means for controlling the operation of the computing mechanism. It is sufficient for the present to observe that, when said hooks are in engagement with said eyes, said means are in operative position, so that, through the depression of the numeral keys, the computing mechanism is actuated, but, when the slide bar is moved to the right, so that the hooks are disengaged from said eyes, the computing mechanism is disconnected from the numeral keys. To move said bar longitudinally, there is secured upon said bar near the left hand end thereof a pin 11 extending into the forked lower end 12 of a lever 13 pivoted at 14 on a plate 15, secured by posts 16 upon the plate 2. The forked upper end 17 of said lever 13 is engaged by a pin 18 carried by the upper end of a cross-shaped switch lever 19 pivoted at 20 on the plate 15, said pin 18 moving in a curved slot 21 in said plate 15. The movement of said switch lever is therefore limited by the ends of said slot. Loose on the pin 18 is a sleeve 22 having front and rear crank arms 23, 24. The front crank arm carries a handle 25 by which said crank may be turned, and to said handle is connected a spring 26 attached to a pin 27 carried at the top of the plate 15. The rear crank handle 24 is slotted as shown at 28, (see Fig. 5) and into said slot extends a pin 29 carried by an arm 30 pivoted at 31 in the lower end of the switch lever. To said pin 29 is connected a link 32, which is connected at its lower end to a lever 33 having a temporary reverse key 34. The cross arms of the switch lever carry stop pins 35, and to the left hand one of said stop pins is connected a rod 36 which sliding in a guideway 37, moves through the end of a lever 38 and carries a collar 39 abutting against the under side of said end. The rear end of said lever is forked, as shown at 40, and engages a pin 41 carried by the bell crank lever 42 which is operated by the case shift key 43.

*Shift key control.*—In the Underwood machine, as is well known, each type bar carries two type, of which one prints normally and the other only when the shift key is depressed. All of the nine digits are arranged in the typewriting machine to correspond to what are known as the "lower case" characters of the top row of keys 44, so that they may be printed by said keys without using the shift key. Since some other character than a numeral is also carried on each numeral type bar, therefore, if the shift key is used, and a numeral key operated, said other character is then printed. It is therefore desirable at that time to operatively disconnect the computing mechanism from the numeral keys 44. In the normal position of the typewriter, in which it is not desired to use the computing mechanism, the parts are in the position shown in Fig. 5. In this position, the slide bar 5 has been moved to the right, and, consequently, the hooks 7 are disengaged from the eyes 8 and the computing mechanism is disconnected.

Figure 4:
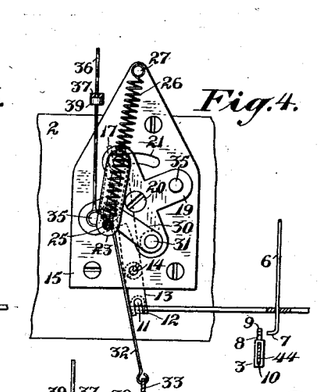
Figure 5:
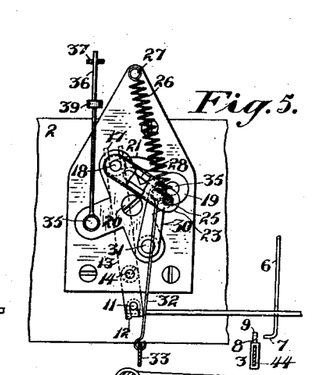
Figure 6:
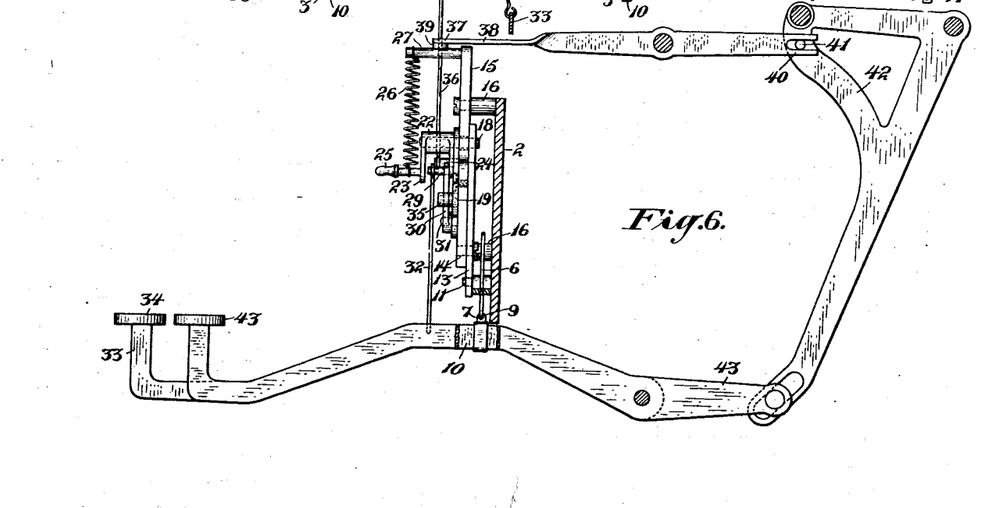
Fig. 6 is a vertical transverse section of the front portion of the machine, particularly showing the parts illustrated in Figs. 3 to 5.

Upon comparing Figs. 5 and 4, it will also be seen that, if the case shift key be operated, it will raise the pin 41, which will thereby raise the rear end of the lever 38, and depress the front end. But the depression of said front end will have no effect upon the key connections, because the collar 39 upon the rod 36 is already depressed, and cannot therefore be depressed by depression of the front end of the lever caused by the depression of the shift key 43, so that the key connections are permanently disconnected.

Figure 3:
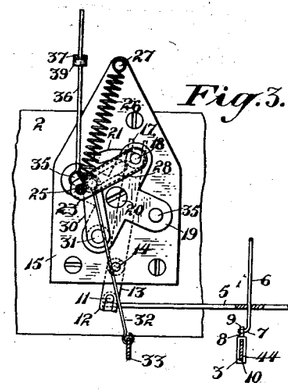
Figs. 3, 4, and 5 are broken enlarged detail front views of the mechanism, in various positions, for connecting the numeral keys with the computing mechanism and for disconnecting them therefrom.

When it is desired to bring the computing mechanism into continued use, the crank handle 25 is shifted to the left, which moves the spring 26 to the left in line with the upper end of the switch lever and therefore rocks said switch lever from the position shown in Fig. 5 to the position shown in Fig. 3, in which position it is held by the tension of said spring. This has the effect of raising the slide rod 36 carrying the collar 39, and at the same time swinging the lever 13 so that the lower end of said lever 13 correspondingly moves the slide bar 5 to the left, and causes the hooks 7 to engage the eyes 8 so that the computing mechanism is now permanently connected. If now the shift key is depressed, it will have the effect of depressing the collar 39, and therefore also rocking the switch lever, and consequently will temporarily disconnect the key connections, as shown in Fig. 4. It will not, however, change the position of the spring 26, so that, as soon as the pressure is removed from the shift key 43, the spring 26 again returns the switch lever to the position shown in Fig. 3 and connects the keys with the computing mechanism.

The depression of the temporary reverse key 34 has the same effect, if the computing mechanism is connected, as would the depression of the typewriter shift key 43. For the depression of the temporary reverse key 34 causes the link 32 to be depressed, and as this link is substantially in line with the direction of the crank arm 30, to the pin 29 of which said link is attached, the effect of pulling upon the crank arm is to pull upon the lower end of the cross-shaped switch lever 13, moving said lever from the position shown in Fig. 3, to the position shown in Fig. 4, against the action of the spring 26. This temporary reverse key may also be used to temporarily connect the computing mechanism when normally disconnected, as, if the temporary shift key be depressed, when the parts are in the position shown in Fig. 5, the cross-shaped switch lever 13 will be rocked to the position shown in Fig. 3, but the crank arm 23 and the spring 26 will remain in the position shown in Fig. 5, ready to restore the parts to their original position, as soon as the pressure is removed from the temporary reverse key.

*Controller.*—The stems 6 are connected at their upper ends to bell crank levers 55 pivoted on the plate 2, (Fig. 1) the other arms of which are connected to rods 56, passing within a ring 57 secured to a bracket 74 connected to the plate 2, said rods being connected, respectively, to blocks 58 connected to levers 59 pivoted on said ring 57. Thus, upon depressing any one of the numeral keys, the outer end of the corresponding lever 59 is moved to the right. Secured on the right hand side of the frame of the typewriting machine is a bracket 60, (Fig. 1) supporting a vertical plate 61, carrying posts 62, supporting a guide plate 63, having a circular series of holes, through which extend the ends of nine pusher rods 64, pivotally attached to the several bell crank levers. Said plate 63 is additionally supported by a strut 73 connected to the bracket 74 attached to the plate 2. Having its bearing in the plate 61 is a shaft 65 of a controller 66, which, as will be presently described, is under constant rotational pressure. Stop bolts 67, of which there should be not less than ten, slide in a circular series of slideways 68 in said controller, which slideways register with the pusher rods 64, and said bolts project to the left of said controller normally, and until they are displaced by the action of the pusher rods 64. An annular coiled spring 69, which surrounds the controller, in a groove therein deep enough to intersect the slideways for the bolts, and which is adapted to engage one or the other of two grooves 70 (Fig. 8) formed in each bolt, yieldingly maintains the bolts in the positions to which they have been moved. When any numeral key has been operated, and the corresponding pusher rod moved through the guide plate, its end impinges upon the end of one of the stop bolts projecting from the left hand side of the controller, and moves said stop bolt to the right, so that its other end then projects from the right hand side of said controller. The operation of a numeral key not only thus projects a bolt, but actuates an escapement, hereinafter described, for the controller, so that the controller is released and rotates. Its stoppage, after a certain extent of rotation, is effected by means of the then projected stop bolt impinging against a rotary stop wheel 71, (Figs. 7, 8, 9, 23) and the extent of rotation depends upon its circumferential distance from the stop wheel, when it is so projected, and therefore upon the particular pusher rod and the particular key lever which were then operated. Upon the next operation of a numeral key and rotation of the controller, the stop bolt is, by means of a wedge 72 on the plate 61 and located in the path of the projected stop bolt, returned to its normal position, in which it projects from said controller to the left instead of to the right, and it is retained in that position by the annular coiled spring 69.

*Escapement.*—Secured upon the front side of said plate 2 is a guideway 75 for a stem 76, the other end of which is pivotally connected to a lever 77 pivoted at 78 upon the ring 57, to the other arm of which lever 77 is secured a spring 79, which normally tends to draw said arm to the left, and therefore said stem to the right. Said stem 76 carries a disk 80, and all of the rods 56 pass through holes in said disk.

When any numeral key has been operated, and thereby the corresponding rod 56 moved to the left, the block 58, by which it is connected to the bell crank lever 59, then abuts against said disk 80, and carries said disk with it to the left, thus rocking the lever 77. The long arm of said lever is connected at its extreme end by a link 81 with an arm 82 on an escapement shaft 83, so that, by said movement of said lever, said escapement shaft is rocked. Said escapement shaft carries, adjustably, two disks 84, 85 (Fig. 23) spaced apart a short distance, and having respectively formed in their beveled edges notches or recesses 86, 87, offset from each other. Through said plate 61 passes a stop shaft 88, which, on the left side of said plate 61, carries the before-mentioned stop wheel 71, which is star-shaped, having points any of which is adapted to lie in the path of a bolt 67 in the controller which has been projected to the right, and arrest said controller if said stop shaft is at that time itself held fast and non-rotatable. Secured upon the end of said stop shaft, upon the right hand side of the plate 61, is an escapement wheel 89, having the same number of points as the wheel 71, a point of which escapement wheel normally abuts against the first or rear disk 84. Therefore, when any numeral key has been actuated, and thereby the escapement shaft 83 rocked, the disk 84 is thereby moved until the notch 86 therein comes opposite to the point of the escapement wheel 89, which can then immediately pass through said notch. This it immediately does, because, as already mentioned, the controller shaft is under constant rotational pressure, so that the previously projected bolt is pressing against a point of the rotary stop wheel 71. After said point has passed through said notch 86, it then abuts against the second disk 85, and the stop shaft is again held from further rotation. The slight movement thus given to the stop wheel 71 allows the bolt arrested thereby to move only a very short distance. Then, upon the release of the numeral key, the escapement shaft 83 returns to its original position, in which position the notch 87 in the second disk 85 now comes opposite to the said beveled point or arm of the escapement wheel 89, which thereupon escapes therethrough, under the pressure of the projected stop bolt against an arm of the rotary stop wheel 71. This pressure rotates the shaft 88 so that the next succeeding arm of the rotary stop wheel is brought into the path of the last projected bolt, which then impinges against said latter arm, thus again producing bolt rotational pressure on the stop shaft, rotating said shaft until the next succeeding point of the escapement wheel 89 is brought up against the first escapement disk 84, and the parts are then again in their normal position, ready for another operation. It will thus be seen that the extent of movement of the controller shaft is dependent upon the angular position, relatively to the rotary stop wheel 71, of the pusher rod 64 actuated, and therefore upon the particular numeral key which is operated.

Figures 7, 8, 9, 10:
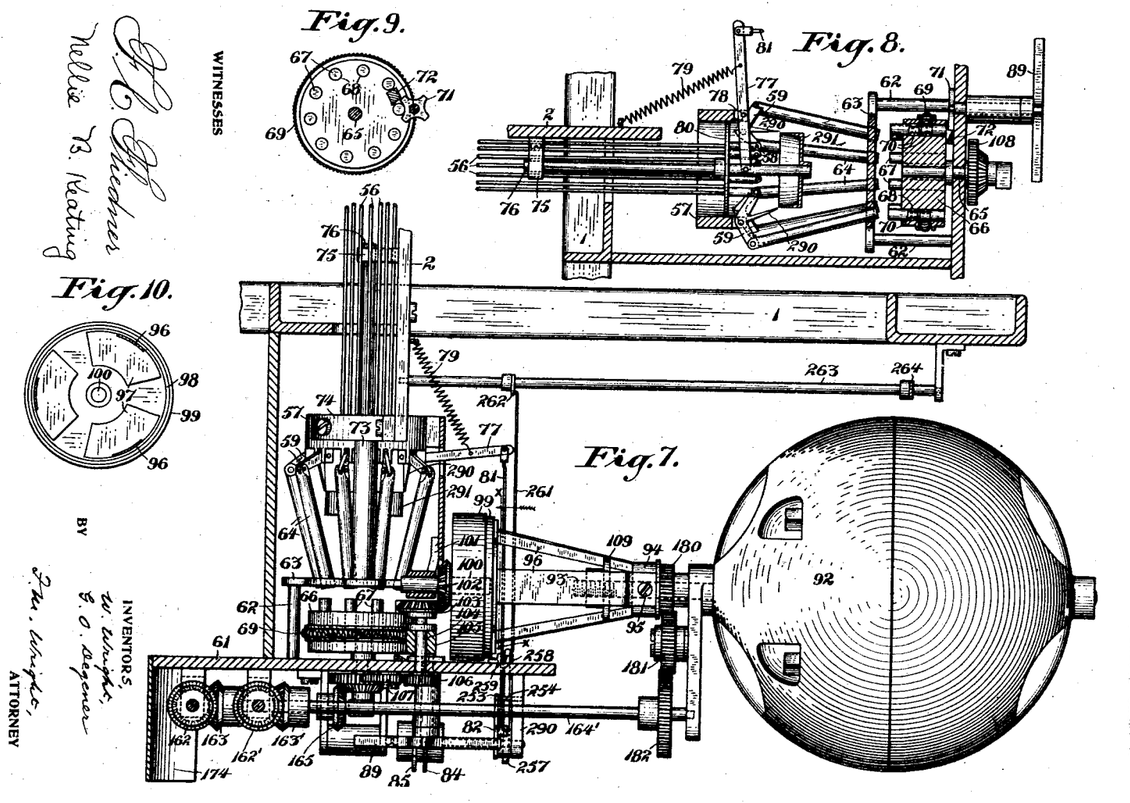
Fig. 7 is a broken plan view of the computing controller.
Fig. 8 is a sectional view of the same showing the parts in a different position.
Fig. 9 is a cross section taken in front of the controller.
Fig. 10 is a cross section on the line *x—x* of Fig. 7.
Figure 11:
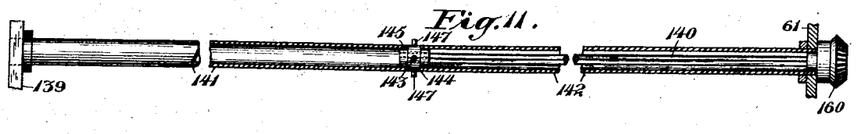
Fig. 11 is a broken plan view, partly in section, of the actuator shaft and the supporting tubes.
Figures 20, 21, 22:
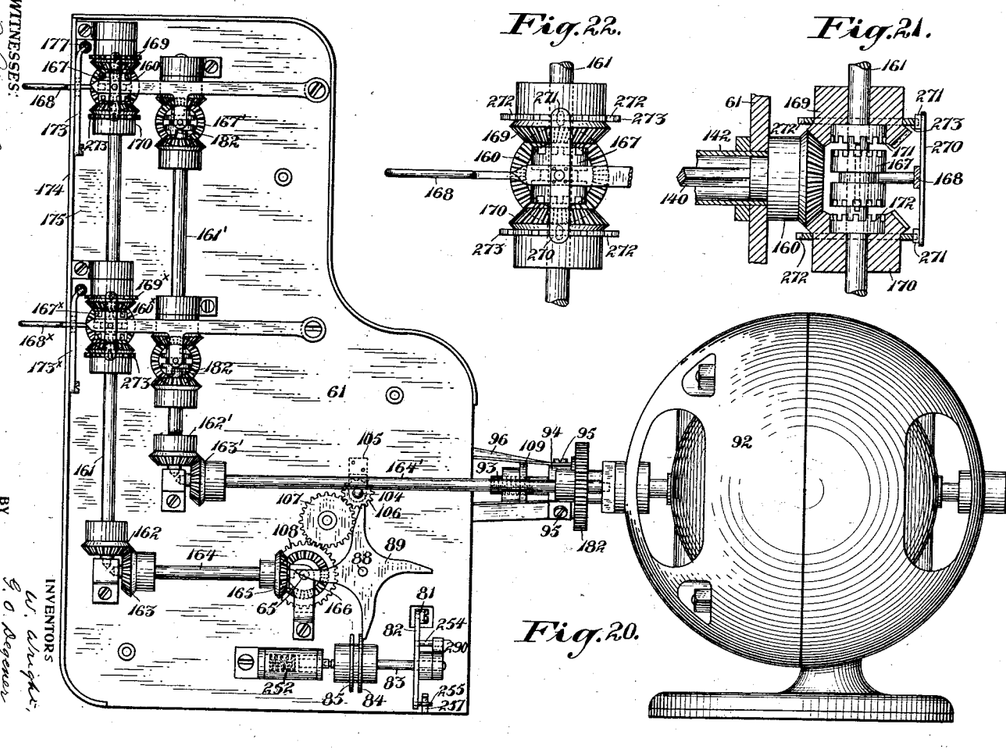
Fig. 20 is an end view showing the driving mechanism.
Fig. 21 is an enlarged side view showing means for locking the reversing mechanism.
Fig. 22 is a front view of the same.
Figures 23, 24, 25, 26, 27:
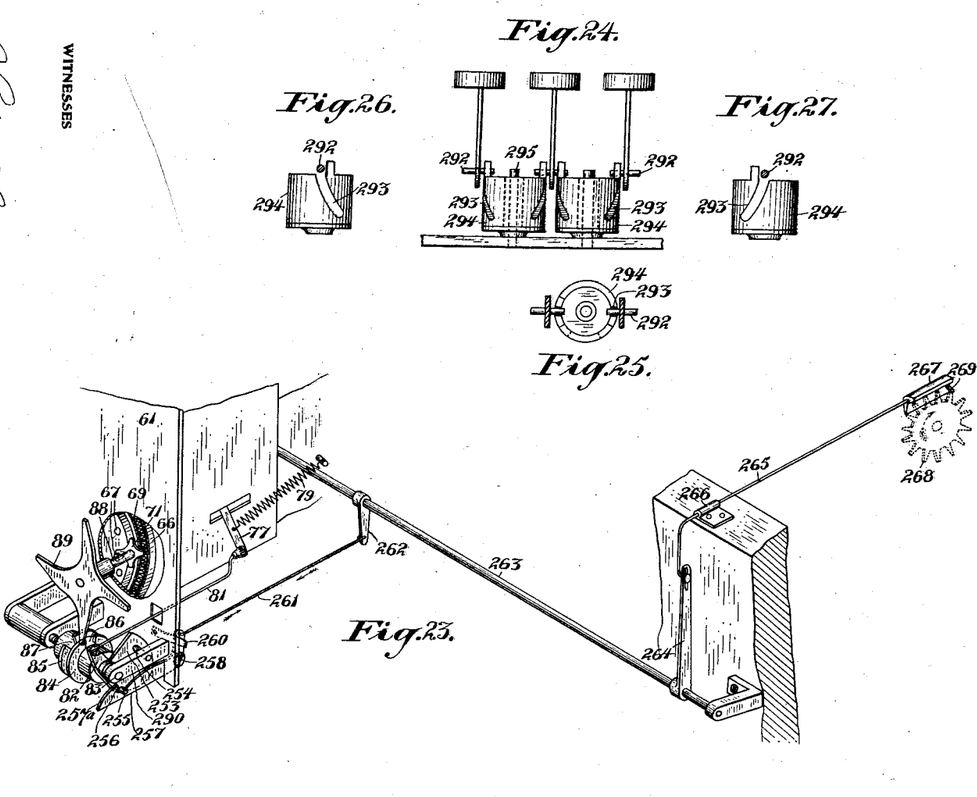
Fig. 23 is a perspective view showing the safety connections between the controller and the typewriter escapement.
Fig. 24 is a front view of key interlocking mechanism.
Fig. 25 is a plan view of an interlocking device thereof.
Fig. 26 is a view of one side thereof.
Fig. 27 is a view of the opposite side.

*Driving.*—It has been already mentioned that the controller shaft 65 is under constant rotational pressure, tending to rotate said shaft whenever released by the escapement. This rotation is derived from any suitable motor, an electric motor 92 being shown herein. The shaft 93 of said motor has secured thereon a head 94 to which are secured, by screws 95, the ends of three spring arms 96 (Figs. 7, 20). To the other ends of said arms are secured arcuate shoes 97, (Fig. 10) which bear against a fiber lining 98 of a cup-shaped head 99 secured upon a shaft 100 having a bearing in a bracket 101 secured to the plate 61.

Said shaft 100 has secured thereon a bevel gear 102 which meshes with a bevel gear 103 on a shaft 104 rotating in a bracket 105 secured to the inner side of the plate 61, as shown in dotted lines in Fig. 20, and carried on its outer end a gear wheel 106 which meshes with an idle wheel 107, which in turn meshes with a gear wheel 108 upon the controller shaft. It is by this means that the controller shaft is given a constant rotational pressure always in the same direction, rotating the shaft whenever it is released.

In order to vary the amount of friction transmitted from the rotation shaft, the outer end of the motor shaft 93 is threaded, and upon said threaded end is screwed a flanged sleeve 109 which is adapted to bear against the spring arms 96. By screwing said sleeve in or out, the pressure upon said spring arms, and therefore the pressure of the shoes 97 against the lining 98 of the head, is increased or diminished as desired.

*Computing mechanism.*—The frame of the computing mechanism comprises end plates 110, 111, and a series of transverse partitions 112. These partitions are connected by an upper bar 113 and two lower bars 114, 115, and are spaced from each other by sleeves 116, around the bars. Said bars at both ends, after passing through the end plates 110 and 111, are secured by means of nuts 118 (Fig. 12), washers 119 being interposed between said nuts and the end plates.

Figure 15:
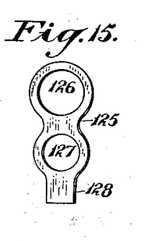
Fig. 15 is a perspective view on a reduced scale of one of the washers.
Figure 16:
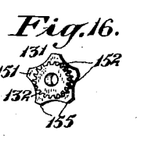
Fig. 16 is a perspective view of one of the transfer wheels.
Figure 17:
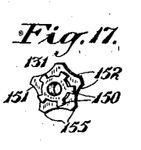
Fig. 17 is a similar view of the same on the opposite side to that of Fig. 16.

Each sleeve 116 is of such length that said sleeve and a partition occupy a longitudinal distance equal to that of four typewriting spaces. Between two adjacent partitions are interposed three register wheels 120, each of the width of one typewriting space, and two spacing washers 121, 122, next to the respective partitions, which washers and a partition together occupy a distance equal to one typewriting space. Said register wheels 120 are in the form of rings supported upon a hollow shaft 123 of comparatively large diameter, supported by the partitions and end plates. Each register wheel has formed on one side thereof a thin gear wheel 124, by means of which it is rotated in the manner to be presently described. On each side of the middle register wheel is a thin washer 125 shown in detail in Fig. 15, having an upper circular opening 126 which surrounds the hollow shaft 123, thereby supporting the washer on said shaft, having also a lower circular hole 127 and a foot 128 contained between the sleeves 116.

Figure 14:
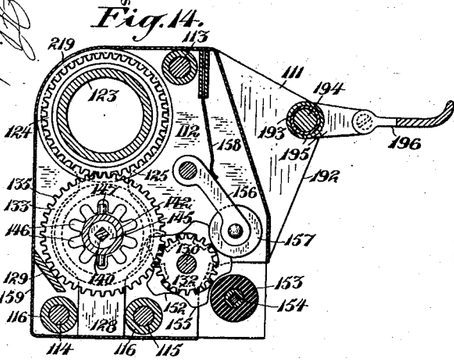
Fig. 14 is a transverse vertical section of the same.

In oblique slots in the front edges of partitions and end plates is a shelf 129. Also extending through all the partitions is a carrying wheel shaft 130, having loose thereon a series of fixed carrying wheels 131, each formed with gear teeth 132. Supported on one side by said gear teeth 132 and on the other side by the shelf 129, (Fig. 14) are a series of computing wheels 133, each computing wheel being of a thickness equal to one typewriting space. Secured in the partitions are short spacing cylinders 134 of a thickness equal to one typewriting space, and co-axial with the computing wheels.

Figure 18:
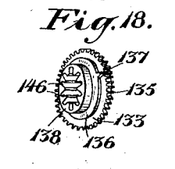
Fig. 18 is a perspective view of one of the computing wheels.

Each computing wheel 133, shown in detail in Fig. 18, is formed on one side with gear teeth 135, adapted to mesh with the gear teeth 124 of the corresponding register wheel, and is also formed, next to said gear teeth 135, with an annular shoulder 136, upon which is a single carrying tooth 137 forming a lateral extension of one of the gear teeth 135. Each computing wheel 133 is also formed with a reduced hub portion 138, (Fig. 18) which, of the left hand one of the computing wheels of a group of three, rotates within the spacing cylinder 134 contained within and secured to the partition on its left.

Upon the left hand end of the frame of the machine is secured a bracket 139. Between said bracket 139 and the plate 61 extends a tube formed in two sections 141, 142, the outer ends of which are loosely mounted in sockets in said bracket and plate respectively. Within the tube 142 on the right extends a square computing shaft 140, which, at the right hand end, passes through the plate 61, and has secured thereon, means, to be presently described, for rotating said shaft 140, and, upon the left hand end, is secured, by a pin 143, a sleeve 144, of the same diameter as the two tubes 141, 142, and lying between the inner ends of said tubes, the sides of sleeve 144 being reduced to form circular, hub-like portions 145, upon which the inner ends of the tubes 141, 142 are loosely supported. Thus the square computing shaft 140 rotates within the tube 142 on the right, and its hub 145 on its extreme end rotates within the tube 141 on the left. The tubes and shaft are not capable of any longitudinal movement, the tubes being confined between the bracket 139 and plate 61. As sleeves on said tubes travel the computing wheels 133, each computing wheel being formed in the middle as an internal gear wheel, having ten recesses or notches 146, and the sleeve 144 has, projecting therefrom, two diametrically opposite pins 147 forming a master wheel, which are adapted to enter any diametrically opposite pair of the ten notches 146, and thus to directly rotate that computing wheel only which is immediately over said sleeve. The tubes 141, 142, are of such length, and so arranged, that the pins 147, are at or substantially in the same vertical plane as, the writing point of the typewriter. Therefore, if the computing shaft is rotated through any given angular distance, the register wheel 120, which is immediately over, or in the same vertical plane as, said pins 147 on said computing shaft are correspondingly rotated.

*Transfer mechanism.*—Each time that a computing wheel 133 makes a complete revolution, the single carrying tooth 137 formed thereon engages one of five lugs 150 of a carrying wheel 131 loose upon said shaft 130, the gear teeth 132 of which mesh with the external gear teeth 135 on the right hand side of the next computing wheel 133 on the left, and said wheel 133 on the left is thereby partly rotated through one-tenth of a revolution. Said carrying wheel is also formed with a disk-like portion 151 having five concavities 152 each in an arc of a circle of slightly greater diameter than that of a transfer cylinder 153, preferably of rubber or other resilient material, secured to a shaft 154 and rotated herewith, which shaft, as hereinafter described, constantly rotates. Said shaft 154 is supported in bearings at suitable intervals in the partitions and end plates, or, if desired, may be journaled only at the ends. When, by the advance of the single carrying tooth 137 in the manner just explained, the carrying wheel 131 has been moved through an angular distance corresponding to a part of one-tenth of the revolution of the computing wheel, it is then in such a position that one of its projecting portions 155, between two adjacent concavities 152, has been forced into sufficiently close contact with the constantly rotating transfer cylinder 153, and is rotated with the latter until its next concave side 152, in turn, assumes a position over the rubber body 153 of the transfer shaft 154.

Figure 13:
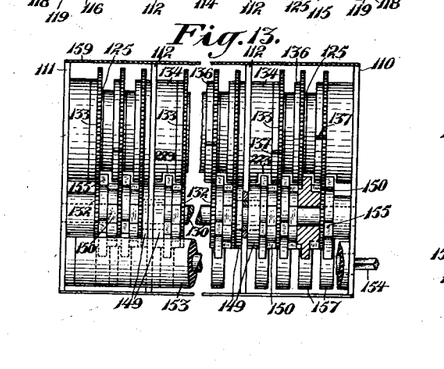
Fig. 13 is a bottom plan view of the same, partly broken away.
Figure 19:
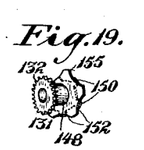
Fig. 19 is a view similar to Fig. 16 of one of the transfer wheels which extends through a partition.

The hub of each third carrying wheel is of a sufficient length, as shown at 148 in Fig. 19, to extend through a partition, being permanently supported therein to carry from the computing wheel on the right hand side of the partition to the next computing wheel on the left thereof (see Fig. 13).

Suitable spacing washers 149 are provided to maintain such carrying wheel in its proper relation to the other wheels. The spacing cylinders 134 are cut away, as shown at 223 to permit the carrying wheel 131 opposite thereto to freely rotate.

In order to aline the figures on the register wheels, and to insure that the carrying wheels 131 are not unduly rotated, there is provided, for each such carrying wheel, a pivoted arm 156 carrying a roller 157 which is pressed by a spring 158 into one of the concave sides 152 of said carrying wheel. It will thus be seen that each computing wheel cannot be advanced by the transfer mechanism more than one-tenth of a revolution, first, because of the roller 157, and, second, because of the form in the peripheries of the carrying wheels, the points of which cannot take hold of the rubber body of the transfer shaft and rotate with it, unless positively forced thereinto. It will be seen that all of the computing devices contained in the main computing mechanism are positively connected throughout the entire series, so that the whole series can be used for a single column or for a variable number of independent columns.

The entire mechanism is covered by a casing 159 having a slot 219 through which a line of figures on the register wheels is exposed to view.

*Independent denominational computation.*—The above construction and arrangement of computing wheels, carrying wheels, and transfer shaft constitute what is believed to be a novel form of computing mechanism for machines, such as adding machines, in which a rotary impulse is imparted directly to a series of devices in succession, corresponding to the several denominational values of the computing mechanism.

In a mere registering mechanism, such as a cyclometer, in which the direct rotary movement is always imparted to the terminal member of the group of computing devices, and the other devices of the group are merely for the purpose of accumulating the movements thus imparted, it is possible, for all of said devices to be connected for carrying by a continuous train of gearing.

But in mechanisms like the present, in which it is necessary to add directly, not only units, but also tens, hundreds, and so on, such a continuous train of gearing is inadmissible. For instance, suppose it were attempted to compute with devices so connected, and the "tens" device stood at 9, and then an addition were made to the device corresponding to the "hundreds" column, the effect would be to rotate, not only the said device, but also the device of the "tens" column. The reason for this is that, when the "tens" wheel stands at 9, its "carrying" tooth is necessarily in contact with the teeth, or similar devices, of the "hundreds" wheel or of the carrying wheel therefor, and, if the wheels are connected in a continuous train, any motion of the latter will therefore produce a corresponding motion of the former. With the present construction this difficulty is avoided in the following manner.

It should first be remembered that each computing wheel is positively geared with its carrying wheel on the right, that is, the carrying wheel which connects it with the next computing wheel on the right, but its only connection with its carrying wheel on the left, which carries to the next computing wheel on the left, is through its carrying tooth. Therefore, each time that a computing wheel is rotated, its carrying wheel on the right, geared thereto, will also be rotated, but the latter wheel will not rotate the next computing wheel on the right, even though said next computing wheel on the right be standing with its carrying tooth at the position corresponding to the display of the figure "9" in addition, or "0" in subtraction. For, when a computing wheel stands in this position, the five lugs 150 on the carrying wheel on the left can freely rotate without coming in contact with the carrying tooth 137. Consequently, there is no rotation transmitted from a computing wheel on the left to a computing wheel on the right through the carrying wheel.

Since, however, the carrying tooth 137 of a computing wheel, when either "at 9," or "at 0," is in such a position that the five lugs 150 on the carrying wheel do not engage the same when said carrying wheel rotates in either direction, it is evident that said computing wheel has considerable lost motion, in moving from "9" to "0" or "0" to "9," before it can be brought into operative engagement with the five lugs 150 of the carrying wheel to the left, and it would therefore be impracticable to transmit, through said carrying wheel, to the computing wheel on the left, an amount of rotation, namely, one-tenth of a revolution, equal to that transmitted to said carrying wheel from the computing wheel operated, since the first part of this rotation is made without producing any motion of the said carrying wheel. It is to overcome this difficulty that the transfer shaft is used, for thereby, although the latter part of the motion of one-tenth of a revolution of the computing wheel, after it comes in through operative engagement with the carrying wheel on the left, is effective in imparting only a partial rotation to said carrying wheels, yet this is sufficient, for it is sufficient to cause a projection 155 of the carrying wheel to engage the rubber cylinder 153 of the transfer shaft, and since the latter is in constant rotation, the transfer shaft completes the work which was omitted by the computing wheel in the first part of its rotation, and moves the carrying wheel through the remainder of the necessary rotation to rotate the computing wheel on the left through one-tenth of a revolution.

The principle, then, embodied in this mechanism is, first, to permit the computing wheel to stand in such a position, when at "9" or "0," that the carrying wheel on the left can be freely rotated in either direction; and, second, because this arrangement necessarily requires lost motion of the computing wheel on the right, to compensate for this lost motion by providing extraneous means for rotating the carrying wheel through the latter part of its movement.

*Duplicate computation.*—The machine, as shown provides for two independent computing mechanisms, the secondary computing mechanism and its operating means being hereinafter more fully described. Such parts thereof as it is necessary to refer to will be designated by the affix "×" affixed to the numeral of the corresponding part of the main mechanism.

*Addition and subtraction.*—The computing shafts 140, 140× have respectively secured upon the ends projecting through the plate 61 bevel gears 160, 160×, which are adapted to be driven by a vertical shaft 161, having at the lower end a bevel gear 162, driven by a bevel gear 163, upon a horizontal shaft 164 having a bevel gear 165 driven by a bevel gear 166 upon the controller shaft 65. When said controller shaft has been released by the depression of a numeral key and rotates through an angular distance corresponding to the numeral key depressed, said rotation is transmitted to the vertical shaft 161 and thence to the shafts 140, 140×, selectively, in one or the other direction by means of sliding clutches 167, 167×, slidable upon said vertical shaft 161 but rotating therewith. By means of a lever 168 the clutch 167 is adapted to be brought into operative engagement with either of two bevel gears 169, 170, loose on the shaft 161 and always in engagement with the bevel gear 160. If said lever 168 is moved upward, then the clutch 167 is moved into engagement with a clutch member 171 formed within the upper bevel gear 169, thereby rotating the computing shaft 140 in the direction proper for addition. If said lever is moved downward, the clutch 167 engages the clutch member 172 of the lower bevel gear 170 and rotates the shaft 140 oppositely to its former direction, causing the computing wheels to subtract. If said lever is moved to a mediate position, the clutch 167 is out of engagement, and the computing shaft 140 does not rotate. In order to retain the lever 168 in any position to which it has been moved, there is provided a pivoted bar 173, secured to the front wall 174 of a casing 175 around the end gearing, said bar having three notches 176 adapted to selectively receive the edge of the lever 168, and the bar being pressed against said lever by a spring 177.

167×, 168×, 169×, 173×, indicate parts for the secondary mechanism corresponding to the parts 167, 168, 169, 173, of the main mechanism.

The transfer shaft 154 has a constant rotary movement which is derived from the electric motor 92 by means of a gear wheel 180 on the shaft 93 of the motor, meshing with an idle gear wheel 181, which in turn meshes with a gear wheel 182 on a shaft 164', carrying a bevel gear 163' which meshes with a bevel gear 162' on a vertical shaft 161'; with which coöperate parts similar in their general construction and arrangement to those immediately coöperating with the vertical shaft 161, except as to the form of the clutch sleeve 167', which, in this case, has only a pair of teeth 182 instead of a number thereof, on each side, the reason being that said shaft 161' revolves constantly at a rapid speed, and, when the direction of computation is changed, this must be done while said shaft 161' is in motion, whereas the direction of motion of the computing shaft 140 is never changed except when the shaft 161 is at rest. By arranging that the clutches 167, 167', for the computing shaft and for the transfer shaft are actuated by a common lever 168, it is insured that the transfer shaft will always be rotated in unison with the computing shaft.

Figure 12:
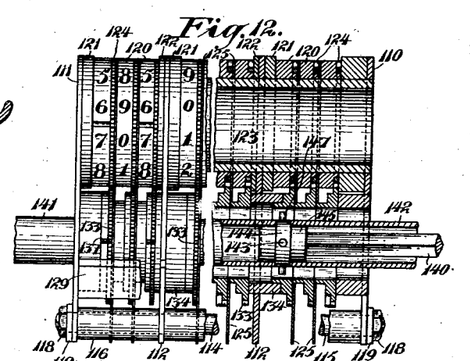
Fig. 12 is a front view, partly in section through a portion of the computing mechanism.

*Grouping.*—The figure wheels are visibly spaced into groups of three, each group, together with the spacing means, occupying four writing spaces of the typewriter. The spacing is preferably effected by the partitions, one of which is interposed between each group and the next, as shown in Figs. 12, 13, and occupies the fourth writing space, or a portion thereof. If it occupies less than a full fourth writing space, the three figure wheels which occupy the remainder of the four writing spaces of the group, should be made correspondingly wider, but always so that the sum of the widths of the three figure wheels, together with that of the spacing means, is equal to four writing spaces of the typewriter.

The computing wheels are also divided into groups of three by the partitions, and the hub 138 of the computing wheel at the left of the group rotates in the spacing cylinder 134, which is of sufficient internal diameter to permit the actuating pins 147 to rotate freely therein. Hence said pins have no effect on the computing mechanism, in case the computing shaft should be rotated at the time the actuating pins are at any such fourth space in the computing mechanism. This arrangement provides that, without disconnecting the numeral key levers from the computing mechanism, the machine is free to operate at each fourth writing space without affecting the computing wheels, so that this space can be used for pointing off the hundreds from the thousands, the thousands from the millions, and so on, and for separating different columns, thereby avoiding any derangement of the computing mechanism, or error in the computation, through erroneously striking a numeral key at that point.

In order to ascertain at any desired time the points at which computation is taking place, either in the vertical or in the horizontal computing mechanism, there are provided stationary pointers 185 which are each in vertical alinement with the actuator pins of the corresponding computing mechanism.

*Horizontal computing mechanism.*—The secondary mechanism is similar to that of the main in the relation of the computing wheels to the figure wheels, in the general construction of the transfer shaft, and in the clutch mechanism for shifting both the computing and transfer mechanisms into any one of three positions, to add, to subtract, or for throwing out of operation. The description, therefore, of such parts of the main computing mechanism as are also found in the horizontal computing mechanism applies also thereto, corresponding parts being indicated by the affix "X" for the horizontal computing mechanism.

One object of the horizontal computing mechanism is to furnish a cross computation of a row of figures whether added to, or subtracted from, the several columns which are being computed by the main computing mechanism, as said figures are progressively written in said columns. This mechanism is also adaptable for the billing machine, that is, a machine by which there is obtained a balance of one or more columns in which some items are to be subtracted, as well as others added, the machine being provided with means for obtaining a horizontal computation of two or more rows, or a balance or difference as two members in a row, to write the total or difference in a separate column, and at the same time to reset the horizontal computing mechanism in readiness for a similar operation, while still retaining the result of each such independent operation in a separate column, the vertical computation of which is retained in the main computing mechanism.

*Resetting and error correction.*—The means for reversing the direction of rotation of the actuator pins 147 provides a convenient means for resetting to zero. This means may be of use either to correct the computing of a figure erroneously printed, or to clear a series of figure wheels to zero to begin a fresh computation. If, just before writing the result of any computation either vertical or horizontal of a series of numerals, the corresponding computing mechanism be reversed, then, at the time of so writing said result, the figure wheels of that mechanism will be automatically set to zero, ready for the next computation.

The writing of the result of the cross-computation in this manner would bring the figure wheels of the horizontal mechanism to zero, at the same time adding it in a grand total column of the mechanism. The writing of the result of the vertical computation brings the figure wheels of the vertical computing mechanism to zero. The writing of the total of the grand total column has the same effect upon both the vertical and the horizontal computing mechanisms, and this result proves the accuracy of all the totals or balances in the vertical columns, in the horizontal rows, and in the grand total column. The above result is all accomplished in one continuous writing of the figures across the sheet in their respective columns, in the same way as matter is written in the ordinary manner by the typewriter when used for correspondence, the only other manipulation necessary being that of reversing the respective computing mechanism before writing any computation of a row or column.

The arrangement of reversing mechanisms, both for the horizontal and vertical computing mechanisms, affords means for obtaining great variability in the character of the computations that may be effected thereby. For instance, there may be debit columns as well as credit columns, or each individual column, or certain of the columns may contain debits as well as credits, which could be written and computed without any explanation except the use of different colors, by a machine using a parti-colored ribbon as, for instance, black for the debits and red for the credits.

In writing such figures in the several columns, representing the debits or credits as the case may be, the proper computations of such figures are simultaneously effected in the vertical and horizontal computing mechanisms as the figures themselves are written horizontally across the sheet in the various columns.

*Main computing mechanism advance.*—The frame of the computing mechanism constitutes a carriage having a wheel 190 which travels upon a track 191 suitably mounted upon the frame of the machine. The end plates of the carriage are extended rearwardly and between said extensions 192 is secured a tube 193 which moves upon a fixed rod 194 secured between the bracket 139 and the plate 61. Secured upon said tube 193 is a yoke 195 between the arms of which is pivotally mounted a latch 196 which can drop between two lugs 197 secured on the frame of the typewriter carriage. By raising said latch the carriage of the computing mechanism is disconnected from the typewriter carriage and no longer travels therewith, but by dropping said latch said computing carriage travels with the typewriter carriage in either direction and at the same speed. The end plates of said computing carriage are extended downward as shown at 200 and between the same is secured a column stop bar 207.

*Column stops.*—Said column stop bar 207 has formed therein a series of sockets 208. In any one of said sockets 208 can be secured by means of a screw 209 a column stop 210 having a projection 211 which, in the operative position of said column stop, projects downward, but, when the column stop is arranged so that the projection extends upward, said column stop is thereby rendered inoperative. A shifter arm 213 connected to the carriage 159ˣ of the horizontal computing mechanism carries a shifter 224, having in its upper edge a notch 225, which is adapted to engage any of the projections 211 upon the column stops 210. Said shifter is normally pressed toward the column stop bar 207 by means of a spring 227, so that said notch 225 engages a projection 211 when it has arrived opposite thereto.

*Horizontal carriage advance.*—When the notch 225 is so engaged by a projection, and the typewriter carriage is moved to the left, the column stop bar and therefore also the shifter is likewise moved to the left in unison with the movement of the vertical computing mechanism.

Figure 1:
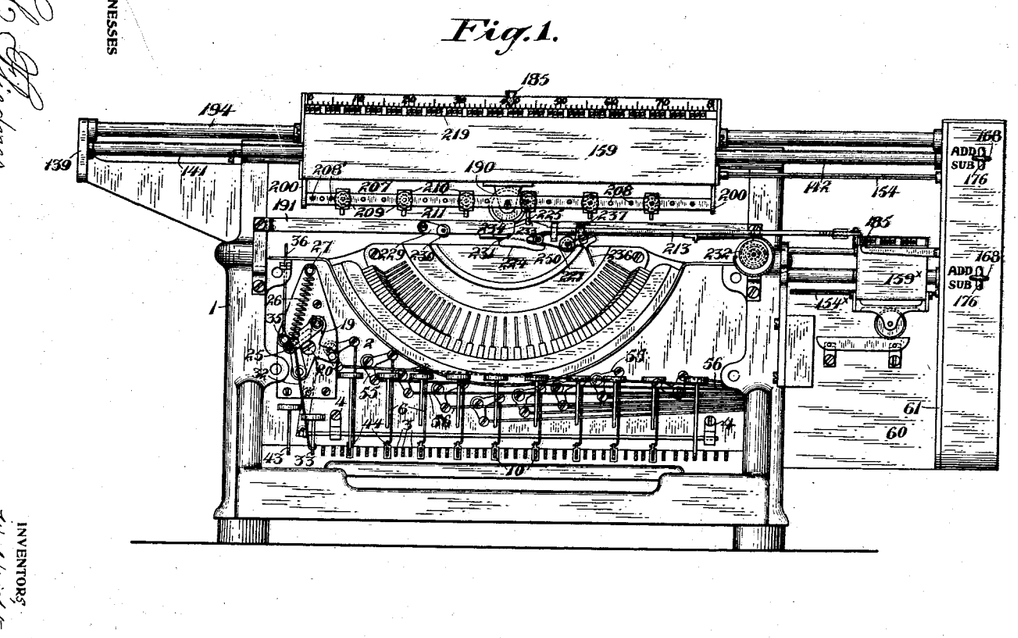
Figure 1 is a front view of the machine.
Figure 2:
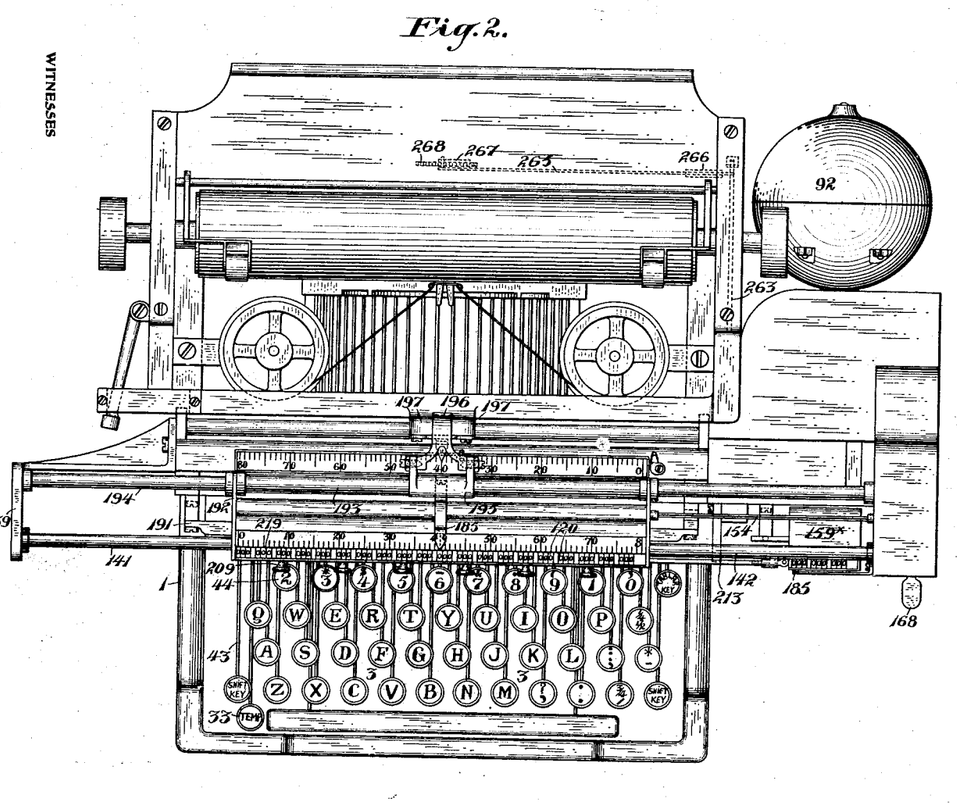
Fig. 2 is a top plan view thereof.

The beginning of the advance of the horizontal carriage is variably determined by the position of the column stops 210, which can be adjustably secured in any of the sockets in the column stop bar. In said stop bar there is here shown a socket 208 at each fourth writing space, so that, wherever the column stops are placed, the carriage of the horizontal mechanism is arrested at the point where its actuating pins are between two groups of computing wheels, and commences the next advance from such point. Sockets 208′ may also be provided in the column stop bar at each writing space as shown in Fig. 1. This is of advantage, when it is desired to use the horizontal mechanism by itself and independently of the vertical mechanism. It will readily be seen that the horizontal mechanism, while so called, is also equally well adapted for computing vertical columns, and thus may be used for billing or other purposes.

When it is desired to use the vertical column without producing any movement of the horizontal carriage, a lever 236 is moved to the right, said lever having a pin 237 which bears down upon the upper edge of the arm 213, thereby depressing the shifter 224 so that its notch 225 cannot engage any one of the projections 211 of the column stops, and the column stop bar can reciprocate without said column stops producing any effect upon the horizontal computing mechanism.

250 indicates a limit stop which arrests the return of the horizontal carriage to the right when it would not otherwise be arrested by the column stop.

*Horizontal carriage return.*—Secured upon a stationary support secured upon the track is a short arm 229, upon the end of which is mounted a roller 230, and when the shifter 224 arrives at said roller, the latter arrives at the sloping advancing edge 231 of said shifter and thereby depresses the shifter and its arm 213, which carries the shifter, against the action of said spring 227, releasing the notch 225 from the projection 211 on the column stop. When it is released, it is immediately retracted by a spring 232 which moves it to the right, until the rear sloping edge impinges against the projection 211 of the next column stop to the right, which in its turn is advanced in a position to engage said notch 225. On the rear side of the notch there is formed a low shoulder 233, the object of which is to prevent any recoil of the shifter when the shoulder 234, on the left of the notch 225, strikes said projection, and also to lock the shifter in a position in which the projection 211 engages the notch 225, the spring maintaining said projection and notch in engagement.

It will thus be seen that the carriage of the horizontal mechanism receives an intermittent advance in unison with the advance of the carriage of the vertical mechanism, the end of such advance being determined by the position of the roller 230, which position is such that the carriage of the horizontal computing mechanism always ceases to advance when the last of the computing wheels thereof has passed the actuating pins of the horizontal computing mechanism shaft.

*Speed controls.*—By means of the escapement two safety controls are provided.

It is to be remembered that, at the time a numeral key is depressed, the actuating pins 147 are not within the computing wheel which is to be rotated by the next depression of said numeral key, but are still within the computing wheel last rotated, or in a position to have been rotated, and that, before a computation can be effected by the depression of a numeral key, it is necessary that the computing wheel by which the desired computation is to be effected be first brought into engagement with the actuator pins. If the rotary motion of the actuator pins were to commence before such engagement is effected evidently confusion and incorrect computation would result. The object, therefore, of the first safety control is to prevent any rotation of the computing shaft before the typewriter carriage, which is the means of bringing said computing wheels into proper relative position, has completed its movement.

It is also evident that, if a second numeral key is depressed while the controller is rotating, the proper stop bolt 67 in the controller may not be arrested by the stop wheel 71, and the computation may be rendered erroneous, or the mechanism rendered inoperative. I therefore provide the following safety controls.

The escapement shaft 83, on which are fast the disks 84, 85 is slidable longitudinally, and is pressed in a longitudinal direction by a spring 252 Fig. 20. This spring operates to move the shaft forward longitudinally only in the intermediate position of the escapement wheel 89, when neither one of its points is engaging a disk on said shaft. As soon as a point of said escapement 89 passes through the notch 87 in the second disk, then the spring 252 acts to move the shaft 83 longitudinally, and it remains in this latter position for a time, which, however, is very minute, until the next point of the escapement wheel 89 strikes the first disk 84 on said shaft 83, and therefore again moves said shaft longitudinally against the pressure of said spring 252. To said shaft 83 is secured a plate 253, which, in fact, forms an extension of the arm 82 to which is attached the link 81. When the escapement shaft 83 is rocked, so as to permit the point of the escapement wheel which was in engagement with the second disk to pass through the notch therein, said plate 253, has, by the rocking of said shaft 83, been moved downward, and, as soon as said point passes through said notch 87, in the rear disk, the spring 252 moves the shaft 83 longitudinally into such a position that the upper edge of said plate 253 lies underneath a fixed pin 254 projecting from a bracket 290. The computation is completed when the next point of the escapement wheel arrives at the first disk 84 on the escapement shaft, and, if another numeral key be struck before the computation is completed, said key cannot be depressed, for the reason that the depression of said key can only be effected by rocking said escapement shaft 83 by means of the link 81, which cannot be done, because the plate 253 is still immediately beneath the pin 254, and therefore cannot be raised. But, as soon as said next point of the escapement wheel 89 impinges against the first disk 84 of the escapement shaft, then the pressure of said wheel 89 on said shaft 83 overcomes the pressure of the spring 252, and moves the shaft 83 against said spring, so that the edge of the plate 253 is now moved in a parallel direction from underneath the pin 254, so that said plate is free to move upward and the shaft 83 is free to rock, and the numeral key can be depressed.

This speed control is not necessary for any ordinary usage of the machine, and is only included to make it absolutely impossible to produce an incorrect computation, even if special efforts are made to do so, or to eliminate any possibility of overspeeding, by which a result in the computation might be produced similar to that produced in excessively rapid writing, when one letter is written partly over another because the carriage has not completed its movement before the next printing takes place.

The second safety control is effected by the following mechanism. To the plate 253 is secured a pin 255, which is adapted to be engaged by a notch 256 formed in a latch 257 pivoted at 258 to a bracket 259 secured upon the plate 61. Said notch is normally pressed toward said pin by means of a spring 260 and is connected by a link 261 with an arm 262 on a rock shaft 263 having suitable bearings on the machine, (one only shown). Said rock shaft 263 carrying an arm 264, to the upper slotted end of which is connected a downwardly bent arm of a link 265 which slides in a guideway 266 and carries at the other end an angle plate 267. Said angle plate rests upon the points of the teeth of the escapement wheel 268 of the typewriter and has a pin 269 adapted to enter the recesses between said teeth. When the carriage is at rest, and the typewriter escapement is in its normal position, the pin 255 is not engaged by the notch 256 of the latch, but, upon the depression of a numeral key and the rocking of the escapement shaft, the pin 255 upon the plate 253 engages a beveled edge 257ª upon the latch 257 and then engages the notch in said latch, the latch being moved upward by said spring until the notch therein engages said pin. When the pressure from the numeral key is removed, so that the key can return, and the typewriter carriage can begin its movement, the escapement wheel of the typewriter advances, thereby moving the pin to the right as viewed in Fig. 23, and rocking the arm 262 to the left and depressing the latch so that the escapement shaft is free to move. Since the movement of the typewriter carriage is so rapid, that, after it has once been released by the removal of the pressure from the numeral key, it must complete its movement before the point of the wheel 89 can have passed through the opening in the second disk, it is thereby insured that the carriage must have completed its movement, and the proper computing wheel brought into operative position in regard to the actuating pins, before the computing shaft can commence its initial rotation, that is, the rotation to a position determined by the depressed key. It will thus be seen that means are rendered effective by the carriage-moving stroke of the numeral key, for operating the computing mechanism, but that such operation is prevented during the movement of the carriage.

*Computing shaft lock.*—It is desirable to absolutely lock the computing shafts when set in their operative position intermediate for addition and subtraction. This is of especial importance when one shaft is being used and the other shaft is not being used, as the same vertical shaft is used for operating both mechanisms, so that, were such means not provided, the vertical shaft 161, when operating one of said computing shafts while the other is in an inoperative position, might through the friction of said shaft 161 with one of the hubs of the bevel gears 169, 170, slightly advance the computing shaft, thereby bringing the actuator pins to positions in which they would not register with the notches of the computing wheels, such actuator pins being at that time generally in one of their inoperative locations. For this purpose, there is secured to each of the levers 168, or 168ˣ a cross bar 270 having at each end a lug 271 which can engage one of ten notches 272 in a ring 273 secured upon the hub of the corresponding bevel gear, thereby locking the bevel gear and therefore also the computing shaft against rotation. When either lever 168, 168ˣ, is shifted from said mediate position, said lugs 271 are disengaged from said notches 272 and the bevel gears are free to rotate.

*Interlocking mechanism.*—It is necessary to prevent errors which would result from the simultaneous depression of two numeral keys, which would have the effect of projecting two numeral bolts 67 and thus producing an error in computation. For this purpose, each of the bell crank levers 59 is formed with a horn or finger 290, which upon the depression of the corresponding numeral key, is immediately moved within the periphery of a cup shaped device 291, secured upon the rod 76. At the same time said cup shaped device 291 is advanced, because of its rigid connection to the universal disk or member 80, so that the outer surface of 291 prevents the inward movement of the finger 290 of the bell crank lever of any other numeral key, and thus prevents the operation of said numeral key.

If two numeral keys were struck consentaneously, that is, with the same speed and at the same time, the cup-shaped interferent 291 might admit of such malaction and two bolts would be set up. This might occur when a striking finger accidentally overlaps two adjacent keys. Hence in Figs. 24 to 27 is shown means for preventing the simultaneous depression of two adjacent numeral keys. For this purpose the stem of each numeral key is provided with two pins 292 extending on opposite sides thereof, and adapted to enter oblique slots 293 formed in a cylindrical locking device 294 mounted on a vertical shaft 295. The slots on opposite sides of the same locking device 294 extend in opposite circumferential directions, so that it is impossible to simultaneously project the two keys on opposite sides of said locking device.

Variations may be resorted to within the scope of the invention, and portions of the improvements may be used without others.

We claim:—

1. In a computing attachment for typewriters, the combination of a plurality of computing mechanism, individual actuators therefor, numeral keys, a shaft adapted to be rotated by the depression of a numeral key, a shiftable device for each actuator, whereby each actuator may be rotated in either direction by the rotation of said shaft, a shifter for each device, and means associated with each shifter for positively locking its actuator in an inoperative position, substantially as described.

2. In a typewriting and calculating machine, comprising numeral keys and computing mechanism controlled by certain numeral keys, the combination with the keys, of the projections 290 connected to said keys to be operated thereby, a member 291 movable by any key to position to intercept all the other projections 290, to prevent the other keys from operating; a universal bar or disk 80 common to the numeral keys connected to said member 291, and means connected to said disk for enabling the numeral keys to control the computing machine.

3. In a computing machine, the combination with numeral keys, of computing wheels, a motor, a gear for causing said motor to turn said wheels, indexing mechanism to cause the wheels to be turned to an extent determined by the numeral keys, means for disconnecting said motor from said gear, and means automatically locking said gear against rotation when it is disconnected from said motor, said locking means operatively connected with said disconnecting means.

4. In a computing machine, the combination with numeral keys, of computing wheels, a drive shaft carrying a gear, a master wheel arranged to be driven by a gear meshing with said first gear, an indexing mechanism to control the master wheel, a clutch intermediate said shaft and master wheel, and means locking said master wheel against rotation when said clutch releases said master wheel from said shaft, said locking means operatively connected with said clutch.

5. The combination with a key-controlled drive shaft, of a master wheel shaft having a pinion, computing devices operated by said master wheel, a pair of pinions loose on said drive shaft and in mesh with the pinion on said master wheel shaft, a clutch splined on said master-wheel shaft, means to shift said clutch and to enable it either to connect said drive shaft to either of the pinions thereon, or to silence the latter by disconnecting them from said drive shaft, and means operated by said shifting means, to lock the silenced pinions.

6. The combination with a key-controlled drive shaft, of a master wheel shaft having a pinion, computing devices operated by said master wheel, a pair of pinions loose on said drive shaft and in mesh with the pinion on said master wheel shaft, a clutch splined on said master wheel shaft, means to shift said clutch and to enable it either to connect said drive shaft to either of the pinions thereon, or to silence the latter by disconnecting them from said drive shaft, a locking pinion fixed upon one of said drive shaft pinions, and a lock shiftable into and out of engagement with said locking pinion.

7. The combination with a key-controlled drive shaft, of a master wheel shaft having a pinion, computing devices operated by said master wheel, a pair of pinions loose on said drive shaft and in mesh with the pinion on said master wheel shaft, a clutch splined on said master wheel shaft, means to shift said clutch and to enable it either to connect said drive shaft to either of the pinions thereon, or to silence the latter by disconnecting them from said drive shaft, a locking pinion fixed upon each of said drive shaft pinions, and a locking device having means to engage both of said locking pinions and shiftable into and out of engagement therewith.

8. The combination with a key-controlled drive shaft, of a pair of pinions thereon, a third pinion, a master wheel connected to said third pinion, computing devices operated by said master wheel, a lever, shiftable clutching means coöperating with said lever and said pair of pinions either to enable said drive shaft to turn said third pinion either forwardly or backwardly, or to silence said pinions, and means also operated by said lever for locking said pinions when silenced.

9. In a computing machine, the combination with a set of pin-setting rods grouped around a common center, of a series of bell-cranks for operating them, an extension on each of said bell-cranks, and means to coöperate with said extensions for preventing the operation of any bell-crank until every other similar bell-crank is in inoperative position.

10. The combination with a computing mechanism, of a series of numeral keys, connections for rendering said computing mechanism subservient to said numeral keys, said connections being movable between effective and ineffective positions, a lever for shifting said connections, said lever having a pivot arm and two cross arms, means pivoted to said pivot arm normally under a force tending to move said lever in one direction or another, and stops on said cross arms for limiting said pivotally-mounted means in its movements.

11. The combination with a computing mechanism, of a series of numeral keys, connections for rendering said computing mechanism subservient to said numeral keys, said connections being capable of occupying effective and ineffective positions, a cross lever for shifting said connections, said cross lever having four arms, means for forcing said cross lever into one of two positions, said means being pivotally mounted on two of said arms, and stops for said means provided on the other two of said arms arranged to limit the throw thereof.

12. In a computing machine, the combination with numeral keys and computing devices, of horizontal links connecting said keys to said computing devices, and a key-interfering means for preventing simultaneous actuation of two keys connected to said links intermediate the keys and computing devices.

13. In a computing machine, the combination with numeral keys, of a key-interference device comprising an arm connected to each key, the arms forming a circular group and a single circular member effective on all said arms.

14. In a computing machine, the combination with numeral keys, of a key-interference device comprising an arm connected to each key, a single member effective on all said arms, a typewriter carriage controlled by said keys, and connections for controlling said single member by said carriage.

15. The combination with computing mechanism, of a plurality of keys each adapted when depressed to set into operation said computing mechanism in a predetermined manner, and locking mechanism controlled by said computing mechanism and adapted when one of said keys is depressed to prevent the operation of said computing mechanism by any of the other keys until the operation started by said depressed key is completed.

16. The combination with computing mechanism, of a plurality of keys each adapted when depressed to set into operation said computing mechanism in a predetermined manner, and locking mechanism actuated by a depressed key to prevent the operation of said computing mechanism by any of the other keys, said locking mechanism being controlled by said computing mechanism in its computing operation started by said depressed key to hold said other keys locked until the completion of said computing operation.

17. The combination with computing mechanism, of a plurality of keys each adapted when operated to set into operation said computing mechanism in a predetermined manner, and locking mechanism actuated by said keys and adapted when one of said keys is depressed to prevent the complete return of the parts operated thereby to initial position and to prevent the operation of said computing mechanism by any of the other keys until the operation started by said depressed key is completed.

18. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any one of said slides is operated, and means for locking the remaining slides against operation when one of said slides is operated until the completion of said operation of said totalizing mechanism.

19. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any of said slides is operated, and means adapted when one of said slides is operated to prevent its complete return to its initial position until the completion of said operation of said totalizing mechanism.

20. In a computing machine having numeral keys and computing devices, and also having disconnecting means between the keys and the computing devices, the combination of link connections arranged between said disconnecting means and said computing devices, for connecting the keys to the computing devices, said link connections arranged in a circle, and circular key-interfering means for preventing simultaneous actuation of two keys, said interfering means coöperating with said link connections at points between the disconnecting means and the computing devices.

In testimony whereof we have hereunto set our hands in the presence of two subscribing witnesses.

WALTER WRIGHT.
GUSTAVE O. DEGENER.

Witnesses:
FRANCIS M. WRIGHT,
D. B. RICHARDS.

Copies of this patent may be obtained for five cents each, by addressing the "Commissioner of Patents, Washington, D. C."